(12) United States Patent
Chen et al.

(10) Patent No.: US 6,246,676 B1
(45) Date of Patent: Jun. 12, 2001

(54) METHOD AND APPARATUS FOR IMPLEMENTING PN MASKS FOR A TRUNCATED M-SEQUENCE

(75) Inventors: Jiangnan Chen, Darien; Yuda Y. Luz, Buffalo Grove; Ron Rotstein, Arlington Heights, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/459,688

(22) Filed: Dec. 13, 1999

(51) Int. Cl.$^7$ .................................................. H04B 7/216
(52) U.S. Cl. ............................................ 370/342; 375/130
(58) Field of Search .................................... 370/328, 335, 370/342, 431, 340, 441; 375/130, 140, 141–145

(56) References Cited

U.S. PATENT DOCUMENTS

| | | | |
|---|---|---|---|
| 5,228,054 | * | 7/1993 | Rueth et al. .......................... 375/200 |
| 5,559,828 | * | 9/1996 | Armstrong et al. ................... 375/200 |
| 6,058,136 | * | 5/2000 | Ganesh et al. ........................ 375/200 |
| 6,141,374 | * | 10/2000 | Burns .................................... 375/152 |

* cited by examiner

*Primary Examiner*—Ajit Patel
(74) *Attorney, Agent, or Firm*—Sayed Hossain Beladi; Lalita P. Williams (57) ABSTRACT

Method and apparatus to provide a pseudo random noise (PN) sequence having a particular code phase offset for use in a radio in a Code Division Multiple Access (CDMA) radio system (100). In one embodiment, a first mask (320) is applied to shift a reference PN sequence to the assigned PN code phase (416). Upon reaching the end of the reference PN sequence, the initial state is reloaded (420) into the PN generator state register to reset the state value to its initial value, thereby producing a cyclical sequence. In a second embodiment, a first mask (622) and a second mask (624) are applied to the reference sequence produced by the PN generator state registers (620) to produce the appropriate portions of the output sequence.

23 Claims, 6 Drawing Sheets

METHOD AND APPARATUS FOR IMPLEMENTING PN MASKS FOR A TRUNCATED M-SEQUENCE

BACKGROUND OF THE INVENTION

The present invention relates generally to digital radio communication. More particularly, the present invention relates to a method and apparatus for implementing pseudo-noise (PN) masks in a spread spectrum radio communication system such as a code division multiple access (CDMA) cellular telephone system Spread spectrum radio systems have been implemented in cellular telephone and other radio systems. In a spread spectrum communication system such as a direct sequence CDMA (DS-CDMA) system, all base stations and mobile stations in all cells of the system use the same radio frequency or band of frequencies for communication. One known DS-CDMA system is defined in Telecommunications Industry Association/Electronic Industry Association (TIA/EIA) Interim Standard IS95, "Mobile Station-Base Station Compatibility Standard For Dual-Mode Wideband Spread Spectrum Cellular System" (IS-95A).

In addition to traffic channels carrying voice and other data, each radio in the system broadcasts a pilot channel. The pilot channel transmitted by a base station is commonly received by all mobile stations within range. The base pilot is shared between all mobiles in the cell and is used to obtain fast acquisition of new multipaths and for estimation of channel phase and multipath strength). The base station uses the pilot transmitted by a mobile for multipath searches, tracking, coherent demodulation, and to measure the quality of the link for power-control purposes.

The pilot channel transmitted by each radio in the system uses the same repeating PN sequence but with a different phase offset. Transmitters are uniquely identified by using a unique starting phase or starting time for the PN sequences. For example, in IS-95A, the sequences are of length $2^{15}$ chips and are produced at a chip rate of 1.2288 Mega-chips per second (Mcps) and thus repeat every 26⅔ milleseconds. The minimum time separations are 64 chips in length, allowing a total of 512 different PN code phase assignments in an IS-95A system.

For next generation systems, higher chip rates are planned. Chip rates of n*1.2288 Mcps are planned, where n is 3 or greater. It is proposed to use a truncated m-sequence generated by the following polynomial:

$$P(x)=2^{20}+2^9+2^5+2^3+1$$

The sequence length is $N=2^{20}-1=1048575$.

Using a chip rate of 3×1.2288 Mcps as an example, the number of chips for a period of the pilot PN sequence is $3\times2^{15}$. There are two sequences required, the in-phase (I) sequence and the quadrature phase (Q) sequence. The in-phase sequence is generated by the following linear recursion:

$i(n)=i(n-20)\oplus i(n-17)\oplus i(n-15)\oplus i(n-11)$, for n=1 to $3\times2^{15}$, with the initial state equal to

[i(-19),i(-10), . . . ,i(0)]=[00,000,000,000,000,000,001]

The quadrature phase sequence is generated by $q(n)=q(n-20)\oplus q(n-17)\oplus q(n-15)\oplus q(n-11)$, for n=1 to $3\times2^{15}$, with the initial state equal to

[q(-19),q(-10), . . . ,q(0)]=[00,000,000,000,000,000,001]

The respective PN sequences are generated by a PN generator. To produce a specific code phase for a particular radio at a particular time, a mask is applied to the output of the PN generator.

There is a problem with the truncated m-sequence proposed for next generation CDMA systems. The problem arises because the sequence is not cyclic or circular. In IS-95A, the length $2^{15}$ sequence repeats every 26⅔ ms. A mask used to shift the sequence returned automatically to the beginning of the sequence. If the boundary of the sequence was reached, the sequence and the shifting mask automatically reverted to the origin of the sequence, referred to as sequence rollover or a rollover boundary. In the proposed next-generation sequence, since the sequence is not cyclic, some control of the mask must be provided to ensure that the mask returns to the beginning of the sequence at the rollover boundary.

Accordingly, there is a need for an improved method and apparatus for implementing PN masks for use with a truncated m-sequence.

DETAILED DESCRIPTION OF THE INVENTION

The present invention provides an improved method and apparatus for implementing PN masks for use with a truncated m-sequence. According to aspects of the invention a method and apparatus to provide a pseudo random noise (PN) sequence having a particular code phase offset for use in a radio in a code division multiple access (CDMA) radio system is provided. In one embodiment, a first mask is applied to shift a reference PN sequence to the assigned PN code phase. Upon reaching the end of the reference PN sequence, the initial state is reloaded into the PN generator state register to reset the state value to its initial value, thereby producing a cyclical sequence. In a second embodiment, a first mask and a second mask are applied to the reference sequence produced by the PN generator state registers to produce the appropriate portions of the output sequence.

The present invention, together with attendant objects and advantages, will be best understood with reference to the detailed description below, read in conjunction with the accompanying drawings.

Figure 1:
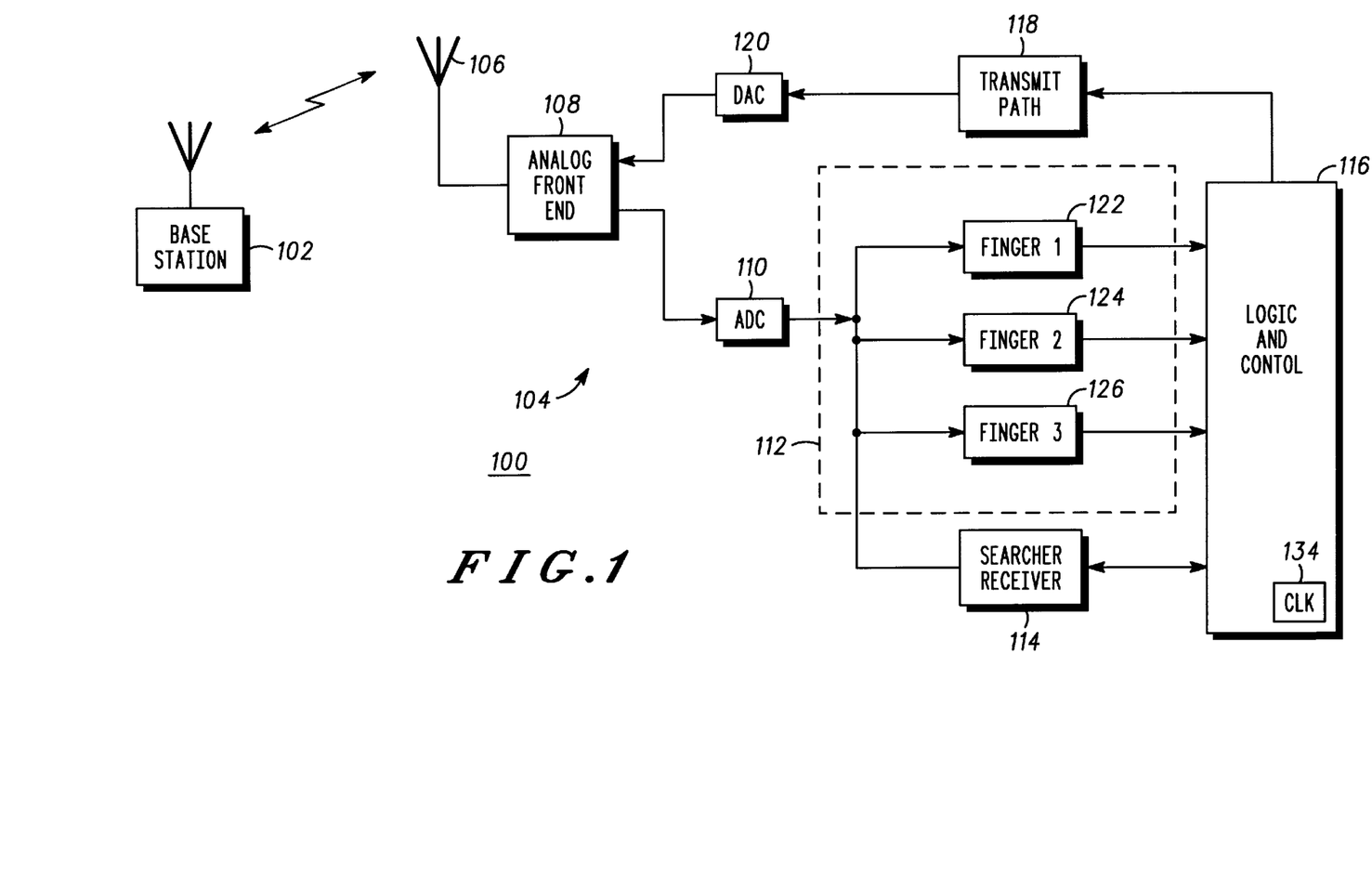
FIG. 1 is a block diagram of a radio communications system.

Referring now to FIG. 1, a communication system 100 includes a plurality of base stations, such as base station 102 configured for radio communication with one or more mobile stations, such as radiotelephone 104. The radiotelephone 104 is configured to receive and transmit direct sequence code division multiple access (DS-CDMA) signals to communicate with the plurality of base stations including base station 102. In the illustrated embodiment, the communication system 100 operates according to any appropriate radio communication standard, including those commonly referred to as IS-95C or cdma2000. IS-95C is a standard published by the Telecommunications Industry Association and Electronic Industry Association. cdma2000 is a standard proposed by the CDMA Development Group.

The base station 102 transmits spread spectrum signals to the radiotelephone 104. The symbols on the traffic jam are spread using a Walsh code in a process known as Walsh covering. Each mobile station, such as the radiotelephone 104 is assigned a unique Walsh code by the base stations so that the traffic channel transmission to each mobile station is orthogonal to traffic channel transmissions to every other mobile station.

In addition to traffic channels, the base station 102 broadcasts a pilot channel, a synchronization channel and a paging channel. The pilot channel is formed using a predetermined data sequence, such as all zeros, that is covered by Walsh code 0, which consists of all zeroes. The pilot channel is commonly received by all mobile stations within range. The pilot channel is used by the radiotelephone 104 for identifying the presence of a CDMA system, initial system acquisition, identification of multi-path rays from communicating and interfering base stations, and for coherent demodulation of the synchronization, paging, and traffic channel. The synchronization channel is used for synchronizing mobile station timing to base station timing. The paging channel is used for sending paging information from the base station 102 to mobile stations including the radiotelephone 104.

In addition to the Walsh covering, all channels transmitted by radios in the system 100 are spread using a pseudo random noise (PN) sequence, also referred to as the pilot sequence. All radios in the system 100, including the base station 102 and all base stations, and the radiotelephone 104 and all mobile stations, are uniquely identified by using a unique starting phase, also referred to as a starting time or phase shift for the pilot channel sequence. The sequence is defined by the following polynomial:

$$P(x) = 2^{20} + 2^9 + 2^5 + 2^3 + 1$$

This yields a total sequence length of $N = 2^{20} - 1 = 1048575$. The sequence is produced at a chip rate which is a multiple of 1.2288 Mcps. For example, the chip rate may be 3*1.2288 Mcps. The spread pilot channel modulates a radio frequency (RF) carrier and is transmitted by base stations to all mobile stations in a geographic area served by the base station. In a mobile station, the sequence is transmitted to one or more base stations serving the mobile station. The PN sequence is complex in nature, comprising both in-phase (I) and quadrature (Q) components. It will be recognized by those ordinarily skilled in the art that all processing of the pilot signal described herein involves both I and Q components.

The radiotelephone 104 comprises an antenna 106 and an analog front end 108, a receive path including an analog to digital converter (ADC) 110, a rake receiver 12 and a searcher receiver 114, a controller 116 and a transmit path including a transmission path circuit 118 and a digital to analog converter 120. The antenna 106 receives RF signals from the base station 102 and from other base stations in the vicinity. Some of the received RF signals are directly transmitted, line of sight rays transmitted by the base station. Other received RF signals are reflected or multi-pathed rays and are delayed in time.

Received RF signals are converted to electrical signals by the antenna 106 and provided to the analog front end 108. The analog front end 108 filters the signals and provides conversion to baseband signals. The analog baseband signals are provided to the ADC 110, which converts them to strings of digital data for further processing.

The rake receiver 112 includes a plurality of receiver fingers, including receiver finger 122, receiver finger 124 and receiver finger 126. In the illustrated embodiment, the rake receiver 112 includes three receiver fingers. However, any suitable number of receiver fingers could be used. The receiver fingers are of conventional design.

The controller 116 controls operation of the radiotelephone 104. The controller is preferably implemented as a microcontroller or other microprocessor. Any suitable control circuit configured to implement stored instructions and data may be used to form the controller 116. The controller 116 includes a clock 134. The clock 134 controls timing of the radiotelephone 104. The controller 116 is coupled to other elements of the radiotelephone 104. Such interconnections are not shown in FIG. 1 so as to not unduly complicate the drawing figure.

The searcher receiver 114 detects pilot signals received by the radiotelephone 104 from the plurality of base stations including the base station 102. The searcher receiver 114 despreads pilot signals using a correlator with PN codes generated in the radiotelephone 104 using local reference timing.

The transmit path 118 assembles data messages for transmission to the base station 102. The data is covered using a PN sequence assigned to the radiotelephone 104. I and Q components are generated corresponding to the data. Both the I component and the Q component have respective PN sequences. In the DAC 120 and analog front end 108, the spread data are used to modulate a carrier signal for transmission to the base station 102.

The base station 102 includes receive and transmit components similar to those illustrated in connection with a mobile station of the system 100, radiotelephone 104. The base station 102 includes a receiver circuit which demodulates and decodes transmissions from mobile stations such as the radiotelephone 104. Further, the base station 102 includes a transmit circuit which encodes and modulates the signals received by the radiotelephone 104. For simplicity, both base stations such as the base station 102 and mobile stations, such as the radiotelephone 104 would be generically referred to herein as a radio or radios of the system 100.

Figure 2:
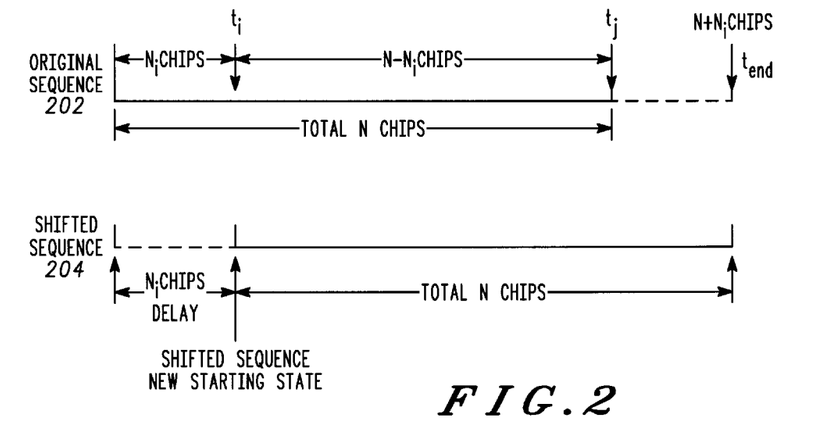
FIG. 2 is a timing diagram illustrating operation of a radio in conjunction with the communication system of FIG. 1.

FIG. 2 is a timing diagram illustrating operation of a radio in the communication system 100 of FIG. 1. As described above, each radio in the system 100 transmits a pilot signal spread using a PN sequence. Each radio uses the same PN sequence as a reference. However, each radio in the system 100 has an assigned particular phase offset within the sequence. Thus, each radio generates the predefined sequence as a reference sequence. The reference sequence is composed of a stream of PN samples0 in sequence. Each radio shifts the reference sequence to form a shifted sequence. That is, each PN sample of the reference sequence is shifted by a predetermined offset to form a shifted sample. The shifted PN samples, in sequence, form the PN sequence used by the radio for covering transmissions by that radio. Each radio in the communication system 100 is assigned a code phase within the sequence. As used herein, the code phase is designated by a delay or advance in time by $M_i$ chips. To perform the shift or delay, a mask M is applied to the reference sequence. The output of the mask $M_i$ is the shifted or delayed sequence. Implementation of such masks is known in the art. Such masking operations may be performed using hardware, including logic circuits such as AND gates and exclusive OR gates. Also, the masking operation may be performed in software using a programmed processor.

FIG. 2 illustrates an original or reference sequence 202 and a shifted sequence 204, shifted by a delay of $M_i$ chips. The original sequence 202 is shifted (delayed) by $M_i$ chips with a PN mask $M_i$. In a radio of the system 100, the shifted sequence 204 may be generated by a PN generator which may be implemented in hardware or software. In one example, it is known to implement a PN generator using a linear feedback shift register (LFSR). Other types of PN generators are known.

In FIG. 2, at time $t_i$ the PN generator starts to output the first bit of the masked or delayed sequence. Generation of bits continues until time $t_j$. At time $t_j$, the PN generator has generated $N-N_i$ bits. However, there are still $N_i$ bits that need to be generated. The number of bits generated is tracked using a sequence length counter. The total sequence, including both the original sequence 202 and the shifted sequence 204 which is output by the PN generator, has a sequence length of N chips. At time $t_j$, the sequence length counter has a total of N counts although only $N-N_i$ bits have been generated. At time $t_{end}$, the sequence length counter has counts of $N+N_i$ and the PN generator has generated a complete cycle of the masked sequence 204. In order to have a cyclic sequence, the state register of the PN generator must reset to the state value at $t_i$ to have the first bit of the original sequence.

Thus, for the reference sequence 202 to be shifted correctly to produce the shifted sequence 204, the sequence length counter needs to be able to count up to two times the desired sequence length N, even though the length to be counted is only up to the sequence length N. The sequence length counter state should be able to be pre-loaded with the shifted length $N_i$ derived from the specific mask for the particular PN phase offset assigned to the radio.

Figure 3:
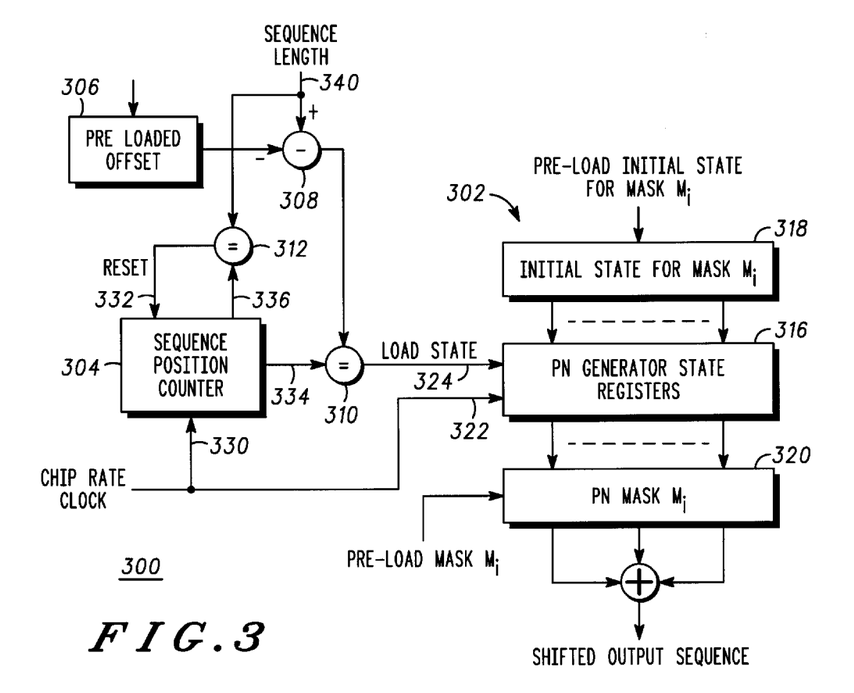
FIG. 3 is a block diagram illustrating a portion a radio in the system of FIG. 1.

FIG. 3 is a block diagram illustrating a portion of a radio of FIG. 1 for generating the shifted sequence 204 of FIG. 2. In FIG. 3, the portion 300 of the radio includes a PN generator 302, a counter 304, a storage circuit 306, a subtractor 308, a first comparator 310 and a second comparator 312.

The PN generator 302 includes PN generator state registers 316, and initial state storage circuit 318 and a mask $M_i$ 320. The PN generator state registers generate the appropriate PN reference sequence, as known in the art. The state registers include a clock input 322 for receiving a clock signal at the chip rate. In response to the clock signal at the clock input 322, the state of the PN generator state registers 316 is advanced to a next state. The reference sequence generated by the PN generator state registers 316 is preferably predefined by an air interface standard or other similar reference.

The initial state storage circuit 318 stores data forming the initial state to be used by the PN generator state registers when generating the reference sequence. The initial state includes a sequence of data bits which correspond to the initial state of the PN sequence to be generated by the radio and corresponding to the particular phase offset assigned to the radio in a communication system. In the illustrated embodiment, the initial state is pre-loaded into the initial state storage circuit 302 by a control circuit such as the controller 116 of the radiotelephone 104 (FIG. 1). The initial state is loaded from the initial state storage circuit 318 into the PN generator state registers 316 in response to a load state signal received at the input 324 of the PN generator state registers. Loading the initial state into the PN generator state registers corresponds to resetting the PN generator state registers 316 to the origin of the shifted PN sequence. This corresponds to sequence rollover or a rollover boundary. Since the sequence defined is not cyclic, some control must be provided to ensure that the sequence returns to its predefined origin at the rollover boundary.

The mask 320 includes hardware or software necessary to generate the delayed sequence from the reference sequence produced by the PN generator state registers 316. As indicated in FIG. 3, the mask to be applied must correspond to the particular PN phase offset assigned to the radio. This mask is referred to mask $M_i$. The mask $M_i$ is preferably pre-loaded into the PN mask 320 by a control circuit such as the controller 116 of the radiotelephone 104 (FIG. 1).

The counter 304 forms a counter which stores the sequence position. The counter 304 may be constructed using any suitable counting circuit. The counter 304 includes a clock input 330 and a reset input 332, a first output 334 and a second output 336. The count maintained by the counter 304 is reset upon provision of a reset signal at the reset input 332. The count maintained by the counter 304 is incremented in response to clock signals received at the clock input 330. The contents of the sequence position counter 304 are provided at each of the first output 334 and the second output 336.

The offset storage circuit 306 stores the delay or offset value corresponding to the particular PN code phase offset assigned to the radio. In the context of FIG. 2, the offset stored in the offset storage circuit is the value $N_i$. Preferably, the offset value may be stored in the offset storage circuit 306 by a control circuit such as the controller 116 of the radiotelephone 104 of FIG. 1.

The subtractor 308 evaluates a difference between the sequence length 340 and the contents of the offset storage circuit 306. It is envisioned that the sequence length 340 will be a constant value. In FIG. 2 this constant value is referred to as N. The sequence length is the total length, in bits or chips of the reference sequence 202 and the shifted sequence 204. The sequence length 340 may be stored for subsequent retrieval and use by the subtractor 308. The subtractor 308 provides a signal to the comparator 310 indicative of the difference between the sequence length 340 and the contents of the offset storage circuit 306.

The first comparator 310 compares the output from the subtractor 308 with the contents of the sequence position counter 304. When these values are equal, a load state signal is generated at the load state input 324 of the PN generator state registers 316. The second comparator 312 compares the sequence length 340 and the contents of the sequence position counter 304. When these two values are equal, the second comparator 312 generates a reset signal at the reset input 332 of the sequence position counter 304.

Figure 4:
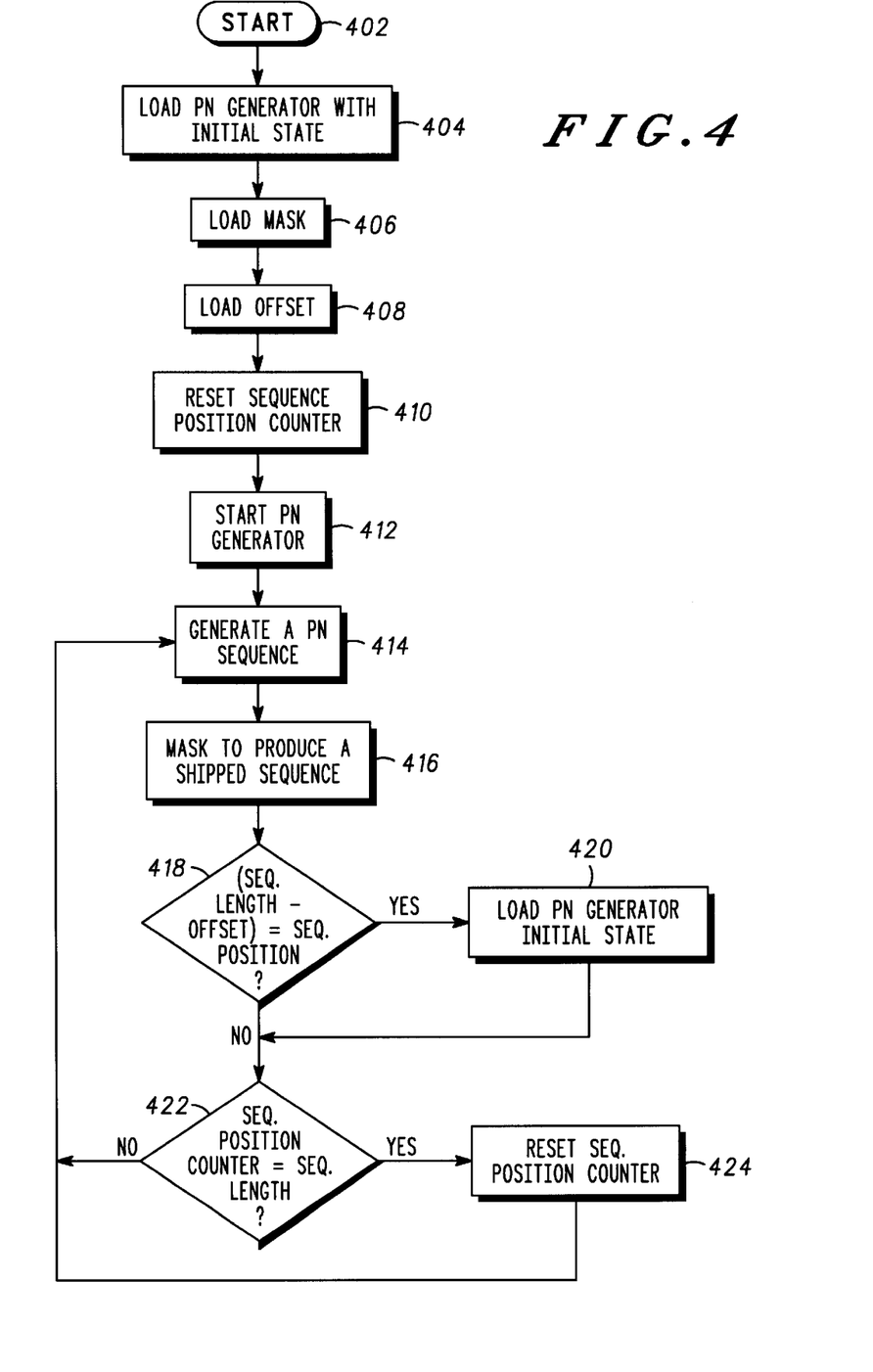
FIG. 4 is a flow diagram illustrating operation of a radio of FIG. 1.

FIG. 4 is a flow diagram illustrating operation of the portion 300 of a radio in the communications system 100 of FIG. 1. The method illustrated in FIG. 4 may be performed by any radio in the communication system 100, including base stations or mobile stations or both. The method begins at block 402.

The method begins with several steps for initializing the radio with information necessary to generate the particular shifted PN sequence corresponding to the particular phase offset assigned to the radio. Thus, at block 404, the PN generator is loaded with an initial state, at block 406, the mask $M_i$ is loaded and at block 408 the offset associated with a particular PN code phase is loaded. Also by way of initialization, at step 410 the sequence position counter is reset to an initial state, such as all binary zeros.

At block 412, the PN generator is started. At block 414, a PN symbol is generated and at block 416, the generated PN symbol is masked to produce a shifted PN symbol. The PN symbol generated at block 414 is an element of the reference PN sequence which is commonly used by all radios in the communications system. The shifted PN symbol produced at block 416 is the current element of the shifted sequence to be used by the radio in accordance with its assigned PN code phase.

At block 418, a comparison is performed. First, a difference is determined between the sequence length and the offset value corresponding to the particular phase offset. The sequence length in the illustrated embodiment is a constant value, N. The offset is the variable value loaded at step 408. The difference is compared with the sequence position which is determined by the sequence position counter. The contents of the sequence position counter, define the sequence position. The sequence position counter is incremented upon generation of each PN symbol.

When the difference between the length of the reference PN sequence and the offset value corresponding to the particular phase offset substantially matches the sequence position, the PN generator is returned to its initial state. At block 420, the PN generator is loaded with its initial state. This corresponds to rollover of the reference PN sequence, or a rollover boundary. If the test of block 418 did not return a match, at step 422 a second comparison is performed. Here, the sequence position counter is compared with the sequence length, N. When the sequence position substantially matches the length of the reference PN sequence, the sequence position as maintained in the sequence position counter is reset to an initial value, block 424. If there is no match, control returns to block 414 and a subsequent PN symbol is generated and then masked at block 416. The radio remains in the loop defined by blocks 414, 416, 418, 420, 422, 424 until interrupted by an external process.

Figure 5:
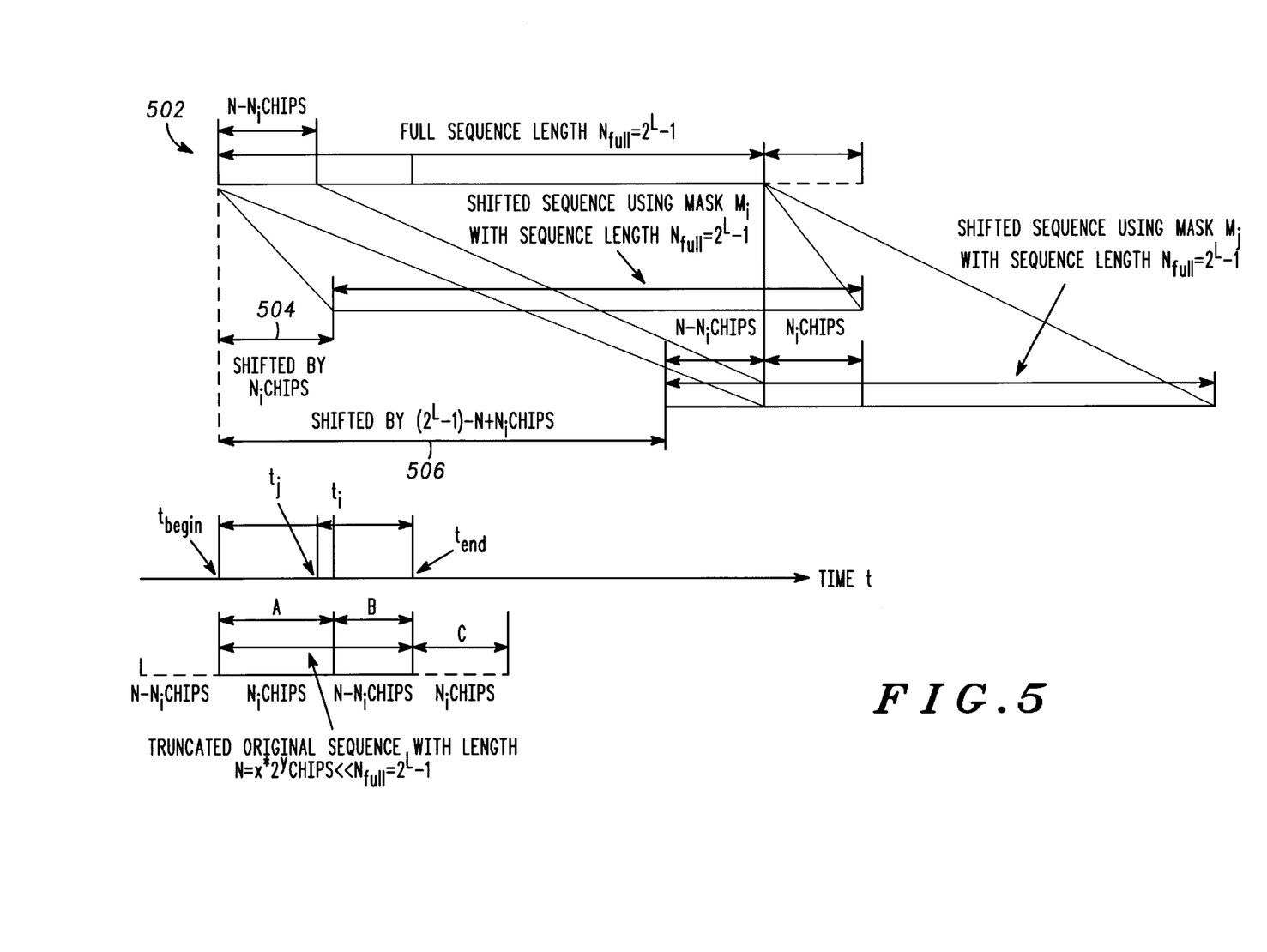
FIG. 5 is a timing diagram illustrating operation of a radio in the system of FIG. 1.

FIG. 5 is a timing diagram illustrating a second embodiment of a method and apparatus for providing a pseudorandom noise (PN) sequence having a particular phase offset. In the second embodiment, one initial state but two masks are used to provide the assigned code phase.

In the embodiment of FIG. 5, a reference sequence 502 is illustrated in conjunction with the shifted sequence 504 shifted by a first mask $M_i$ along with a second sequence 506 produced by a second mask $M_j$.

In the embodiment of FIG. 5, the full sequence length, without any truncation, is $N_{full}=2^{L-1}$. L is the number of bits required for the state registers to form the PN generator. The truncated sequence has a length $N=X*2^y$. In one embodiment, X equals 3 and Y equals 15, which is the case for a 3×chip rate system. As shown in FIG. 5, $M_i$ is the mask required to shift forward (delay) the original sequence by $N-N_i$ chips, or to shift backward (advance) the original, reference sequence by $N_i$ chips. Also, in FIG. 5, $M_j$ is the mask necessary to shift the original sequence by $(2^L-1)-N+N_i$ chips.

In the embodiment of FIG. 5, sequence generation starts at time $t_i$ using mask $M_i$. Mask $M_i$ delays the original sequence by $N-M_i$ bits, from the time $t_i$ to time $t_{end}$. During this time, the PN generator of the radio generates the first $N-N_i$ bits of the unshifted original sequence, illustrated in segment B of the lower portion of FIG. 5.

After the sequence length counter has reached $N-N_1$, the output sequence would reach the point where the original sequence is at $t_{end}$. In order to have a cyclical sequence, the PN generator must reset the PN generator state register to its initial condition at time $t_{begin}$ of the original sequence, illustrated in the lower portion of FIG. 5. The currently lowered mask $M_i$ cannot be used to generate the required bits.

Therefore, the mask is changed at time $t_{end}$ to mask $M_j$. Mask $M_j$ delays the original sequence by $(2^L-1)-N+N_i$ chips. In the top part of FIG. 5, at the beginning of the next sequence cycle, the first $N_i$ states of the original PN generator will have the masked output that maps to segment A of the lower portion of FIG. 5.

Figure 6:
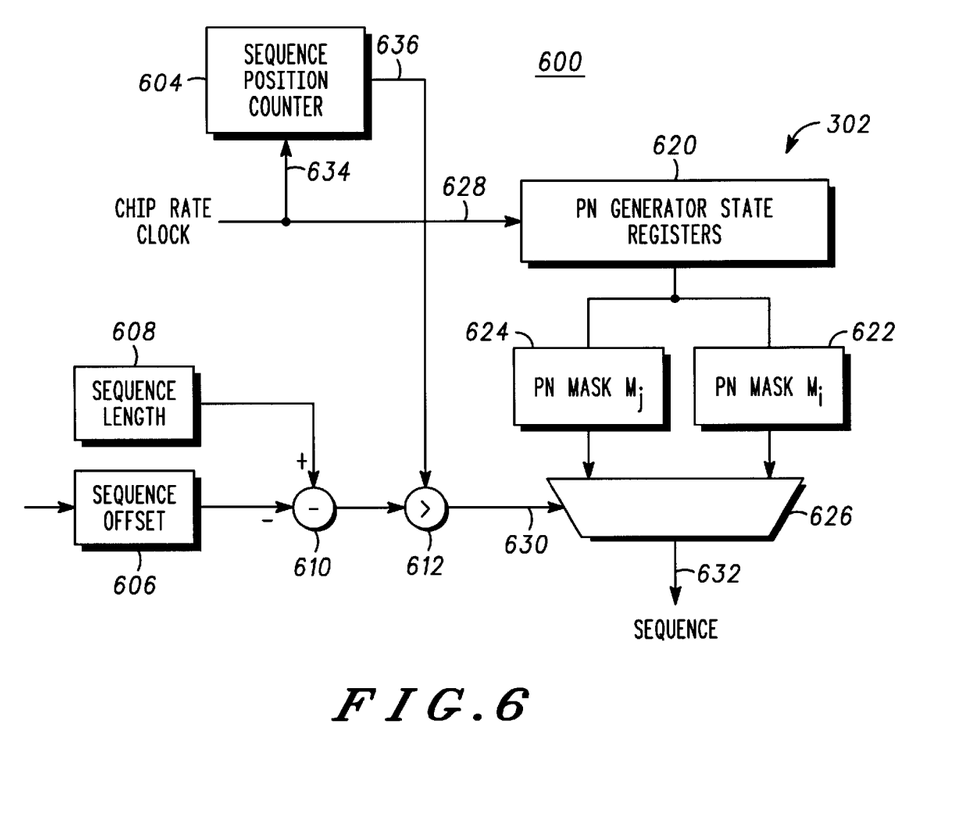
FIG. 6 is a block diagram of a portion of a radio of FIG. 1.

FIG. 6 is a block diagram of a portion 600 of a radio for use in the communication system 100 of FIG. 1 for implementing the timing diagram of FIG. 5. The portion 600 of the radio includes a PN generator 602, a counter 604, a sequence offset storage circuit 606, a sequence length storage circuit 608, a subtractor 610 and a comparator 612.

The PN generator 602 includes PN generator state registers 620, a first mask 622, a second mask 624 and a switch 626. The PN generator state registers 620 generate the reference PN sequence in response to a clock signal received at a clock input 628. The PN generator state registers may be implemented using a linear feedback shift register or any other suitable hardware or software. The first mask 622 corresponds to the mask $M_i$ used to generate the first $N-N_i$ chips in the embodiment of FIG. 5. The second mask 624 corresponds to the mask $M_j$ used to generate chips $(2^L-1)-N-N_i$ as illustrated in FIG. 5.

Switch 626 selects the output of either the first mask 622 or the second mask 624 in response to a control signal received at a control input 630. In the embodiment of FIG. 6, the switch 626 is shown as a multiplexer with a single control input. However, it will be appreciated by those ordinarily skilled in the art that any suitable switching circuit or switching function implemented in software may be employed to perform the described function. Further, the ordering of the PN generator state register 620, the first mask 622, the second mask 624 and the switch 626 may be altered to achieve necessary design objectives such as reduced size, cost and current drain in the radio. The switch 626 has an output 632 for producing the shifted PN sequence.

The sequence offset storage circuit receives the offset value corresponding to the particular PN code phase offset assigned to the radio. This offset value may be stored in the offset storage circuit 606 prior to operation of the radio, at the time the PN code phase is assigned to the radio. In the context of FIG. 5, the sequence offset is designated $N_i$. The sequence length storage circuit 608 stores the total length of the reference sequence and the shifted sequence, N. Preferably this is a constant value but it may be a variable in some applications.

The sequence position counter 604 is a counter which maintains data indicative of the current position in the output sequence. The counter 604 may be implemented using any suitable hardware or software. The counter 604 responds to the chip rate clock signal applied at a clock input 634. The contents of the sequence position counter 604 are provided at an output 636.

The subtractor 610 evaluates a difference between the contents of the sequence length storage circuit 608 and the sequence offset storage circuit 606. Thus, the subtractor 610 produces the difference $N-N_i$. The comparator 612 compares the difference produced by the comparator 610 and the contents of the sequence position counter 604. When the contents of the sequence position counter 604 exceed the difference produced by the subtractor 610, the state of the control signal provided to the control input 630 of the switch 626 changes. In response to this changing signal, the mask sequence produced by the PN generators 602 is changed from the sequence produced by the first mask 622 $M_i$ to the sequence produced by the second mask 624 $M_j$.

Figure 7:
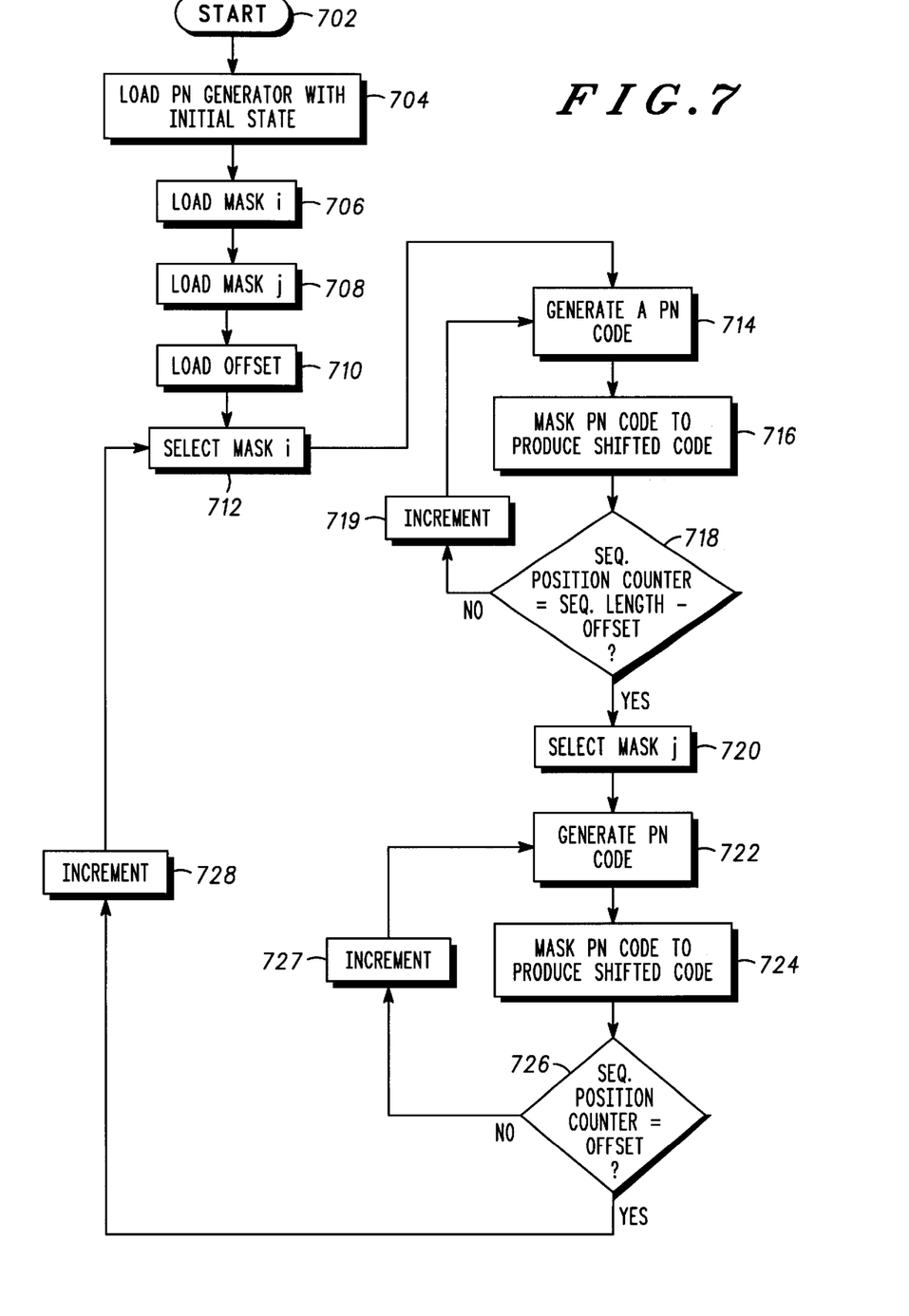
FIG. 7 is a flow diagram illustrating operation of a radio in the system of FIG. 1.

FIG. 7 is a flow diagram illustrating operation of the radio illustrated in FIG. 6 in the communications system 100 of FIG. 6. The method illustrated in FIG. 7 begins at block 702.

The method begins with several initialization steps for initializing the radio with information necessary to produce the PN sequence corresponding to the particular PN code phase assigned to the radio. Thus, at block 704, the PN generator is provided with its initial state. This initial state corresponds to the first PN symbol to be generated in the assigned PN code phase. At block 706, the first mask, mask $M_i$, is loaded and at block 708 the second mask, mask $M_j$, is loaded. At block 710, the offset corresponding to the particular code phase is loaded.

At step 712, to begin generating the sequence, mask $M_i$ is selected. At block 714, a PN symbol is generated from the reference sequence and at block 716 the PN symbol is masked using mask $M_i$ to produce a shifted symbol. At block 718, the sequence position counter is compared with the difference between the length of the reference PN sequence and the offset value. When contents of the sequence position counter substantially match the difference between the length of the reference PN sequence and an offset corresponding to the particular code phase offset, a second mask is applied, block 720. The second mask is the mask designated $M_j$ in FIG. 5. If there is no match at block 718, at block 719 the sequence number is incremented and control returns to block 714 to generate a subsequent PN symbol.

If there was a match at 718 and the second mask is selected at block 720, sequence generation continues. At block 722 a PN symbol is generated and at block 724 the PN symbol is masked using mask $M_j$ to produce a shifted symbol. At step 726 the position counter is compared with the offset value. If there is no match, the position in the sequence is incremented at block 727 and a next PN symbol is generated at block 722. This loop continues during the generation of a number of bits equal to $(2^L-1)-N+N_i$. When the contents of the sequence position counter substantially match the offset at block 726, the first mask is reapplied at block 712 after first incrementing the sequence position at block 728.

From the foregoing, it can be seen that the illustrated embodiments provide an improved method and apparatus for implementing PN masks for use with a truncated m-sequence. In a first embodiment, one mask is used along with one specified initial state. The mask is applied to shift the generated bits by the specified delay and produce the assigned shifted sequence. When the reference sequence reaches its end, the initial state of the PN generator is reloaded to force a jump in the sequence back to its initial state, thereby causing the shifted, output sequence to be cyclical in nature. The second illustrated embodiment uses one initial state but two masks. A first mask is applied from the beginning of PN sequence generation until the end of the reference sequence. At that time, a second mask is applied to produce the bits corresponding to the initial portion of the reference sequence. The two masks may be alternated to generate the necessary sequence.

While a particular embodiment of the present invention has been shown and described, modifications may be made. For example, method steps may be rearranged, substituted and deleted as appropriate. Further, structural elements may be rearranged and substitutions may be made while still providing the required function. It is therefore intended in the appended claims to cover all such changes and modifications which fall within the true spirit and scope of the invention.

We claim:

1. A method for providing a pseudo random noise (PN) sequence having a particular phase offset, the method comprising:

(a) starting at a state of a reference PN sequence corresponding to the particular phase offset, generating a PN symbol;

(b) shifting the PN symbol to produce a shifted PN symbol;

(c) generating a next PN symbol of the PN sequence;

(d) repeating steps (b)–(c) to produce the PN sequence; and (e) when a difference between a length of the reference PN sequence and an offset value corresponding to the particular phase offset substantially matches a sequence position, returning to an initial state of the reference PN sequence.

2. The method of claim 1 further comprising:

(f) incrementing the sequence position for each PN symbol;

(g) when the sequence position substantially matches the length of the reference PN sequence, resetting the sequence position.

3. The method of claim 1 further comprising:

receiving initial state of the reference PN sequence; and receiving the offset value corresponding to the particular phase offset.

4. The method of claim 1 wherein shifting the PN symbol comprises:

applying a mask to the PN symbol to produce the shifted PN symbol, the mask corresponding to the particular phase offset.

5. The method of claim 4 further comprising:

receiving the mask.

6. The method of claim 1 wherein the reference PN sequence is non-cyclical.

7. The method of claim 6 wherein the reference PN sequence is a truncated cyclical PN sequence.

8. A radio comprising:

a processor which controls the radio;

a pseudo random noise (PN) generator configured to generate a PN symbol, the PN symbol being one element of a reference PN sequence;

a masking circuit coupled to the PN generator and configured to shift the PN symbol to produce a shifted PN symbol corresponding to a particular PN phase offset;

a comparator configured to produce a signal when a difference between a length of the reference PN sequence and an offset value corresponding to the particular PN phase offset substantially matches a sequence position; and a storage circuit configured to store an initial state of the reference PN sequence and transfer the original state of the reference PN sequence to the PN generator in response to the signal.

9. The radio of claim 8 further comprising a counter which stores the sequence position.

10. The radio of claim 9 further comprising a clock circuit generating a clock signal to increment the counter for each PN symbol generated by the PN symbol generator.

11. The radio of claim 10 further comprising;

a second comparator configured to produce a second signal when the sequence position substantially matches the length of the reference PN sequence, the counter configured to be reset to an initial value in response to the second signal.

12. The radio of claim 11 wherein the radio comprises a mobile station of a Code Division Multiple Access radio system.

13. The radio of claim 11 wherein the radio comprises a base station of a Code Division Multiple Access radio system.

14. A method for generating a particular pseudo random noise (PN) code phase in a code division multiple access (CDMA) radio, the method comprising:

receiving initial values corresponding to the particular PN code phase;

generating PN symbols starting at a first state of a reference PN sequence and continuing through the reference PN sequence;

shifting the PN symbols to form shifted PN symbols which correspond to states of the particular PN code phase; and when a difference between a length of the reference PN sequence and an offset value corresponding to the particular PN code phase substantially matches a sequence position, generating the PN symbols by again starting at the first state of the reference PN sequence.

15. The method of claim 14 wherein receiving the initial values comprises:

receiving the first state of the reference PN sequence;

receiving the offset value; and receiving a mask for shifting the PN symbols in correspondence with the particular PN code phase.

16. The method of claim 14 further comprising:

upon generation of each PN symbol, incrementing a count of sequence position; and when the count of sequence position substantially matches the length of the reference PN sequence.

17. A method for providing a pseudo random noise (PN) sequence having a particular phase offset, the method comprising:

(a) starting at an initial state of a reference PN sequence corresponding to the particular phase offset, generating a PN symbol;

(b) applying a first mask and producing a shifted PN symbol as one element of the PN sequence;

(c) repeating steps (a) and (b) until a final element of the reference PN sequence is reached;

(d) applying a second mask and producing the shifted PN symbol as one element of the PN sequence; and (e) when an element of the reference PN sequence corresponding to the initial state of the reference PN sequence is reached, applying the first mask, and returning to step (a) to continue producing the PN sequence.

18. The method of claim 17 further comprising:

incrementing a sequence position counter;

when contents of the sequence position counter substantially matches the difference between a length of the reference PN sequence and an offset corresponding to the particular phase offset, applying the second mask.

19. The method of claim 18 further comprising:

comparing contents of the sequence position counter and the offset corresponding to the particular phase offset;

when the contents of the sequence position counter substantially match the offset, applying the first mask and returning to step (a).

20. A radio comprising:

a pseudo random noise (PN) generator configured to generate a PN symbol, the PN symbol being one element of a reference PN sequence, the PN generator having an initial state related to a particular PN code phase assigned to the radio and a final state;

a first masking circuit coupled to the PN generator and configured to shift the PN symbol a first predetermined amount to produce a shifted PN symbol corresponding to a particular PN phase offset;

a second masking circuit coupled to the PN generator and configured to shift the PN symbol a second predetermined amount to produce a shifted PN symbol corresponding to a particular PN phase offset;

a switching circuit configured to selectively couple one of the first masking circuit and the second masking circuit to an output in response to a control signal; and a comparing circuit coupled to the switching circuit which generates the control signal in response to the relative state of the PN generator between the initial state and the final state.

21. The radio of claim 20 wherein the comparing circuit comprises:

a counter which stores sequence position;

a comparator which generates the control signal in response to comparison of contents of the counter and a difference between a length of the reference PN sequence and an offset corresponding to the particular PN code phase assigned to the radio.

22. The radio of claim 20 wherein the radio comprises a base station of a Code Division Multiple Access radio system.

23. The radio of claim 20 wherein the radio comprises a mobile station of a Code Division Multiple Access radio system.

* * * * *